INVENTOR.
Herbert R. Uhtenwoldt

Jan. 7, 1969  H. R. UHTENWOLDT  3,420,008
LOADING MECHANISM
Filed March 14, 1966  Sheet 8 of 9

PRESSURE

IN + OUT

EXPAND

INVENTOR.
Herbert R. Uhtenwoldt
BY
ATTORNEY

RETRACT

UP + COLLAPSE

UNCLAMP + EJECT

United States Patent Office 3,420,008
Patented Jan. 7, 1969

3,420,008
LOADING MECHANISM
Herbert R. Uhtenwoldt, Worcester, Mass., assignor to The Heald Machine Company, Worcester, Mass., a corporation of Delaware
Filed Mar. 14, 1966, Ser. No. 533,904
U.S. Cl. 51—215                                                    6 Claims
Int. Cl. B24b 47/02

ABSTRACT OF THE DISCLOSURE

A loading mechanism or apparatus arranged to transfer workpieces from a chute into a work station of a machine tool, including a shaft extending parallel to the axis of the work spindle, including an arm extending at a right angle to the shaft at its outer end, and including means to move the shaft axially and to rotate it to permit the arm to transfer workpieces.

---

As machine tools such as internal grinding machines become more complicated, due to the effects of automated cycles, the large capital investment in the machine demands that it be used very effectively. With the progressive reduction of workpiece-finishing time, the time consumed in replacing a finished workpiece with an unfinished one becomes more and more important. Very little work has been done in this area and, as a matter of fact, loading devices of the prior art have often been crude. When they performed complex loading functions, they have been extremely complicated and expensive. In addition, the complications led to difficulties in maintenance. The loss of machine time encountered in repairing broken complicated loading mechanisms has discouraged their use to a considerable extent, so that the effectiveness of grinding machines has been maintained at a value which has been difficult to improve. These and other difficulties experienced with the prior art devices have been obviated in a novel manner by the present invention.

It is, therefore, an outstanding object of the invention to provide a loading mechanism which is simple in construction, inexpensive to manufacture, and which is capable of a long life of useful service with a minimum of maintenance.

Another object of this invention is the provision of a loading mechanism which is almost entirely hydraulically controlled, whereby simplicity and ruggedness of operation results.

A further object of the present invention is the provision of a workpiece-loading mechanism for a machine tool, which mechanism is provided with a sequential valve arrangement of a novel nature.

It is another object of the instant invention to provide a loading mechanism in which the various parts of the cycle may be adjusted without difficulty.

It is a further object of the invention to provide an automatic workpiece-loading mechanism which may on occasion be operated semiautomatically with a minimum of difficulty.

A still further object of this invention is the provision of a workpiece-loading mechanism in which a workpiece is introduced into a chucking portion of a grinding machine without scratching the workpiece.

It is a still further object of the present invention to provide a loading mechanism in which the gripping of the workpiece by the carrier and the gripping of the workpiece by the chuck are assured.

With these and other objects in view, as will be apparent to those skilled in the art, the invention resides in the combination of parts set forth in the specification and covered by the claims appended hereto.

Figure 1:
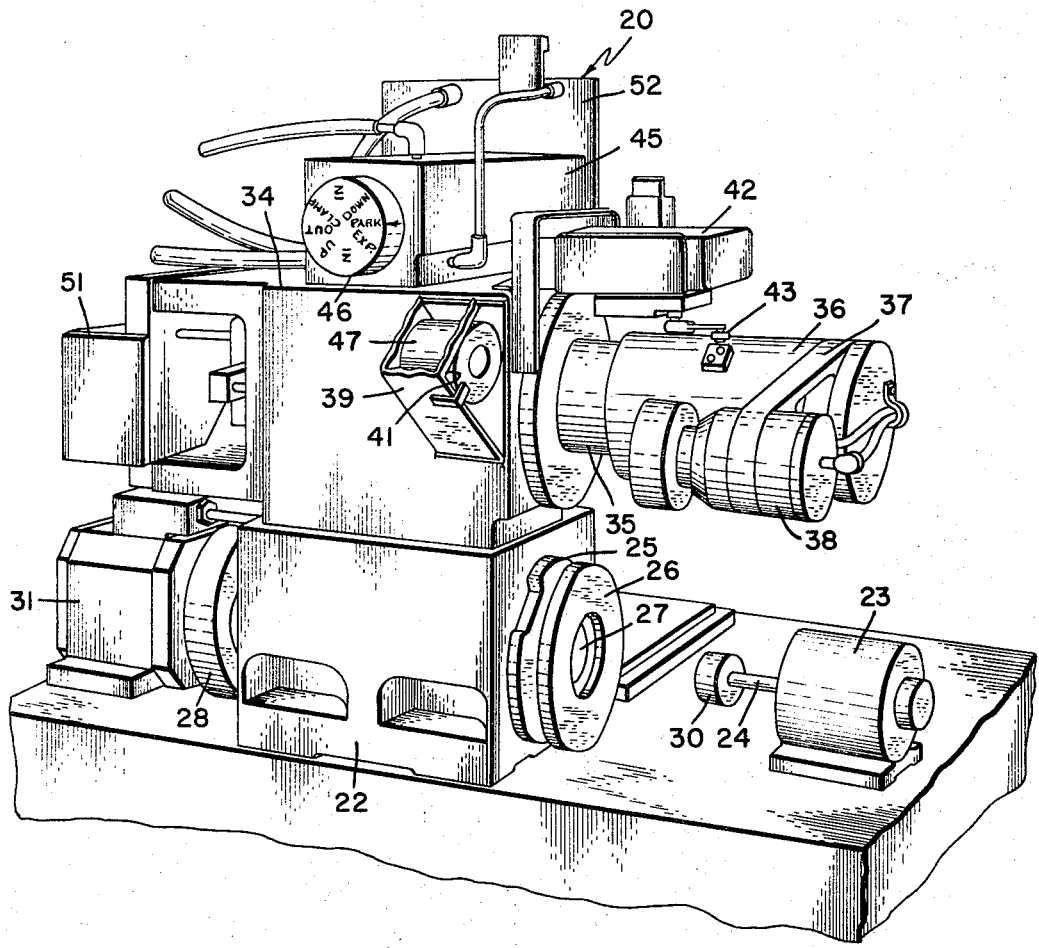
Figure 2:
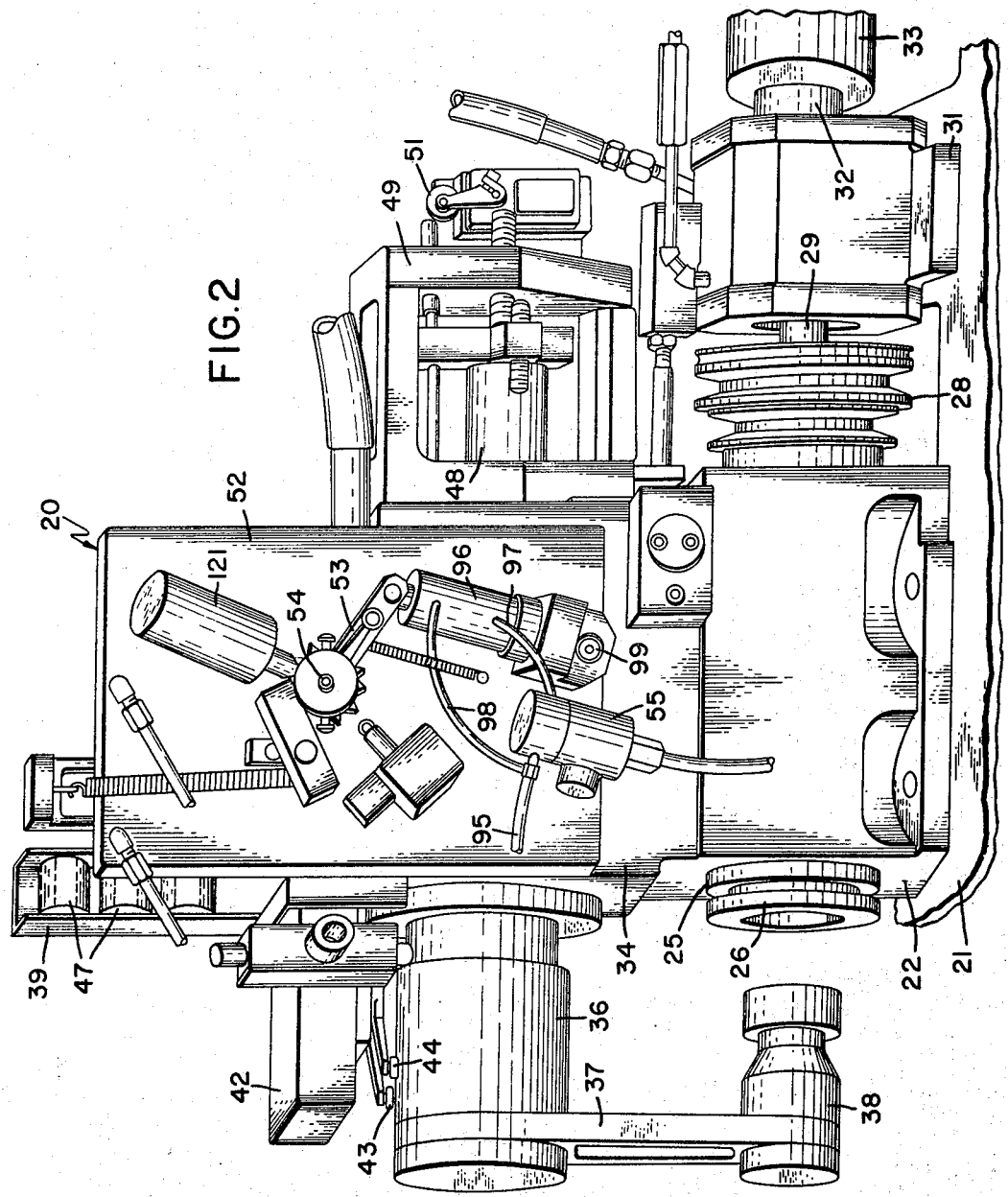
Figure 3:
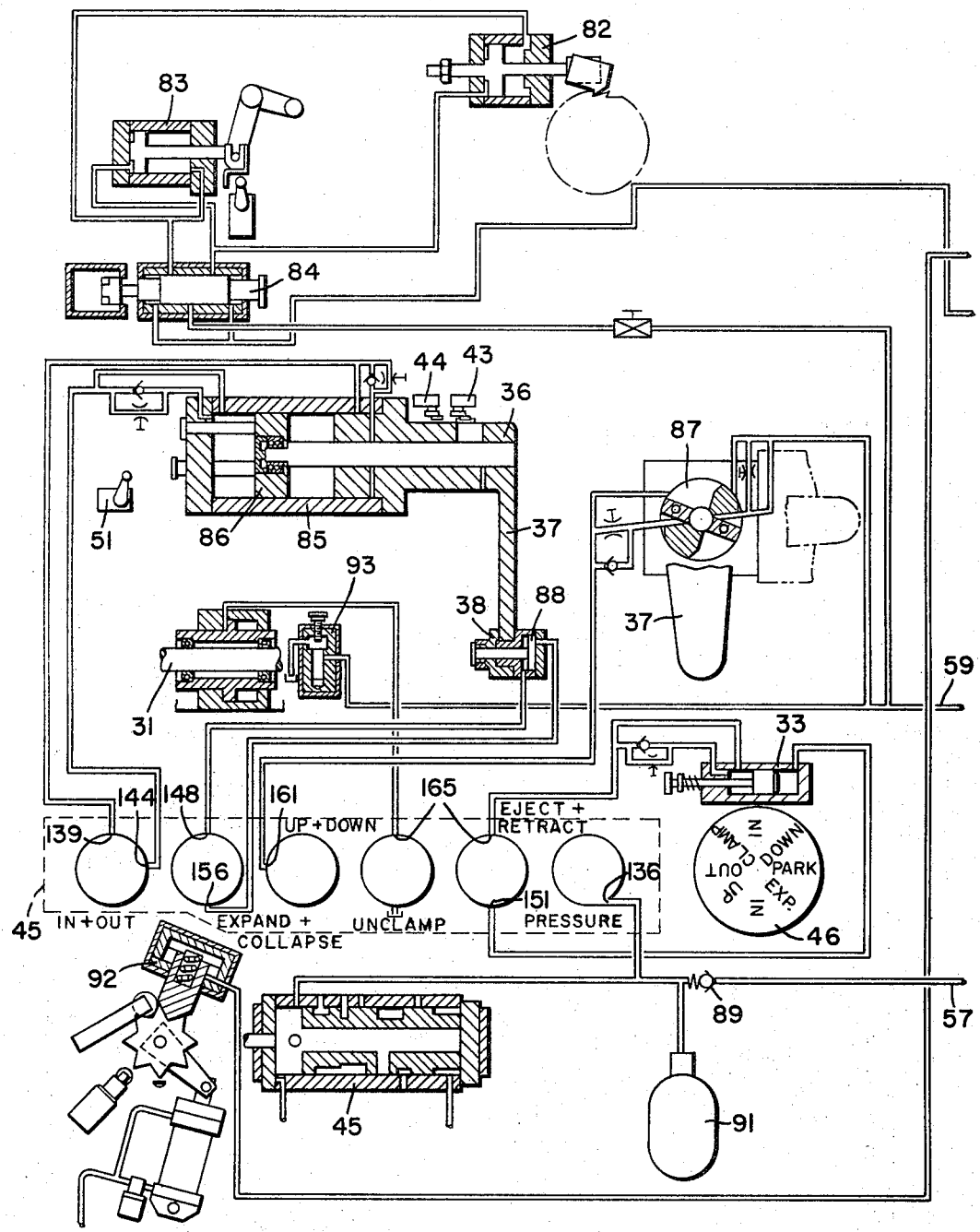
Figure 4:
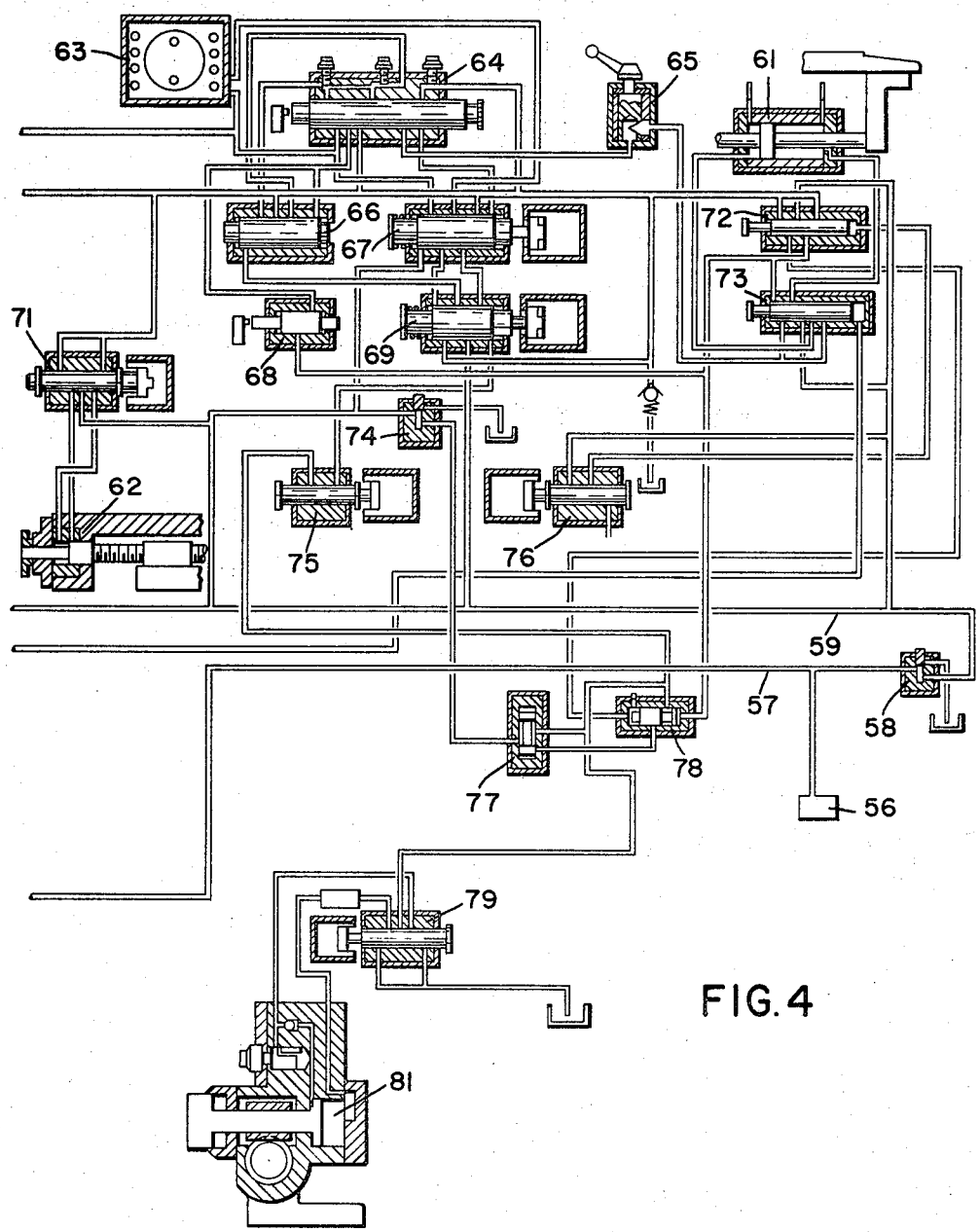
Figure 5:
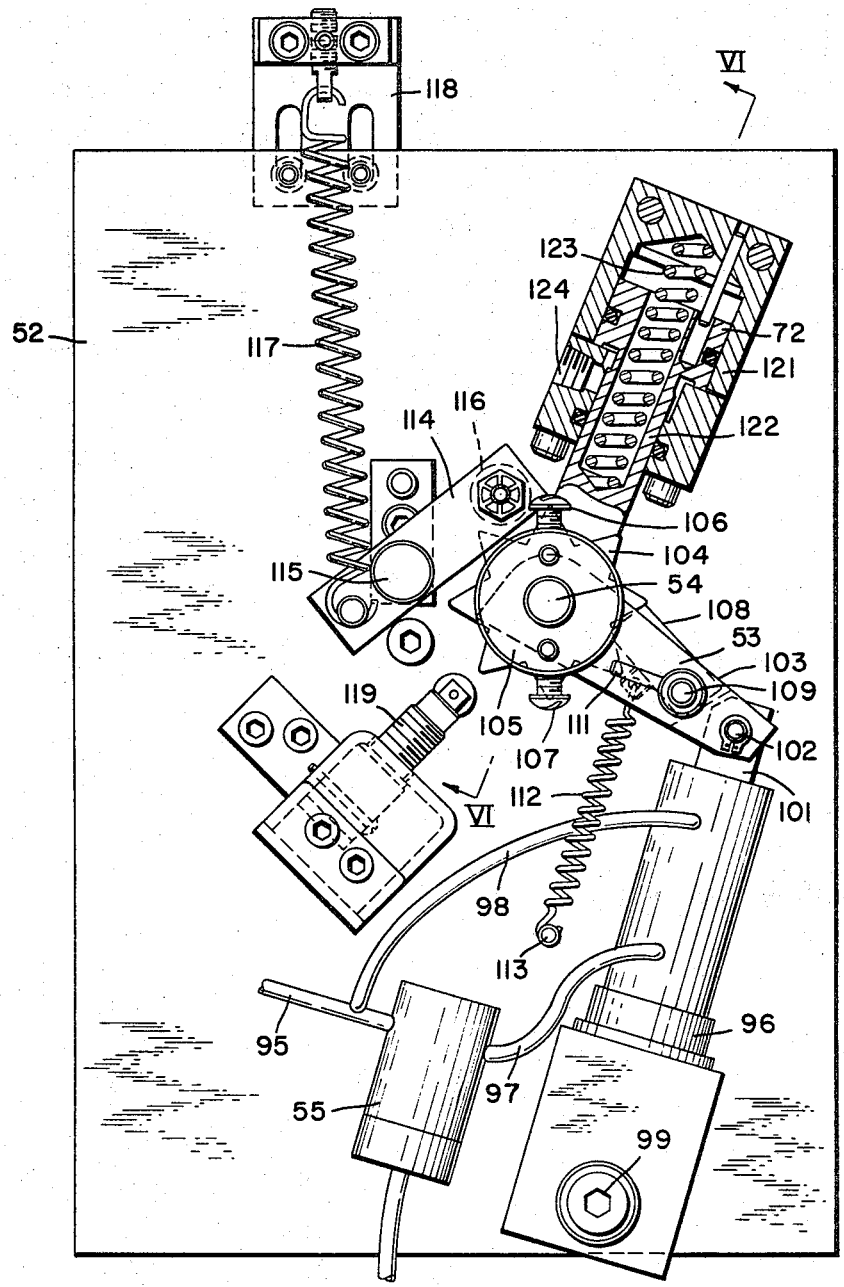
Figure 6:
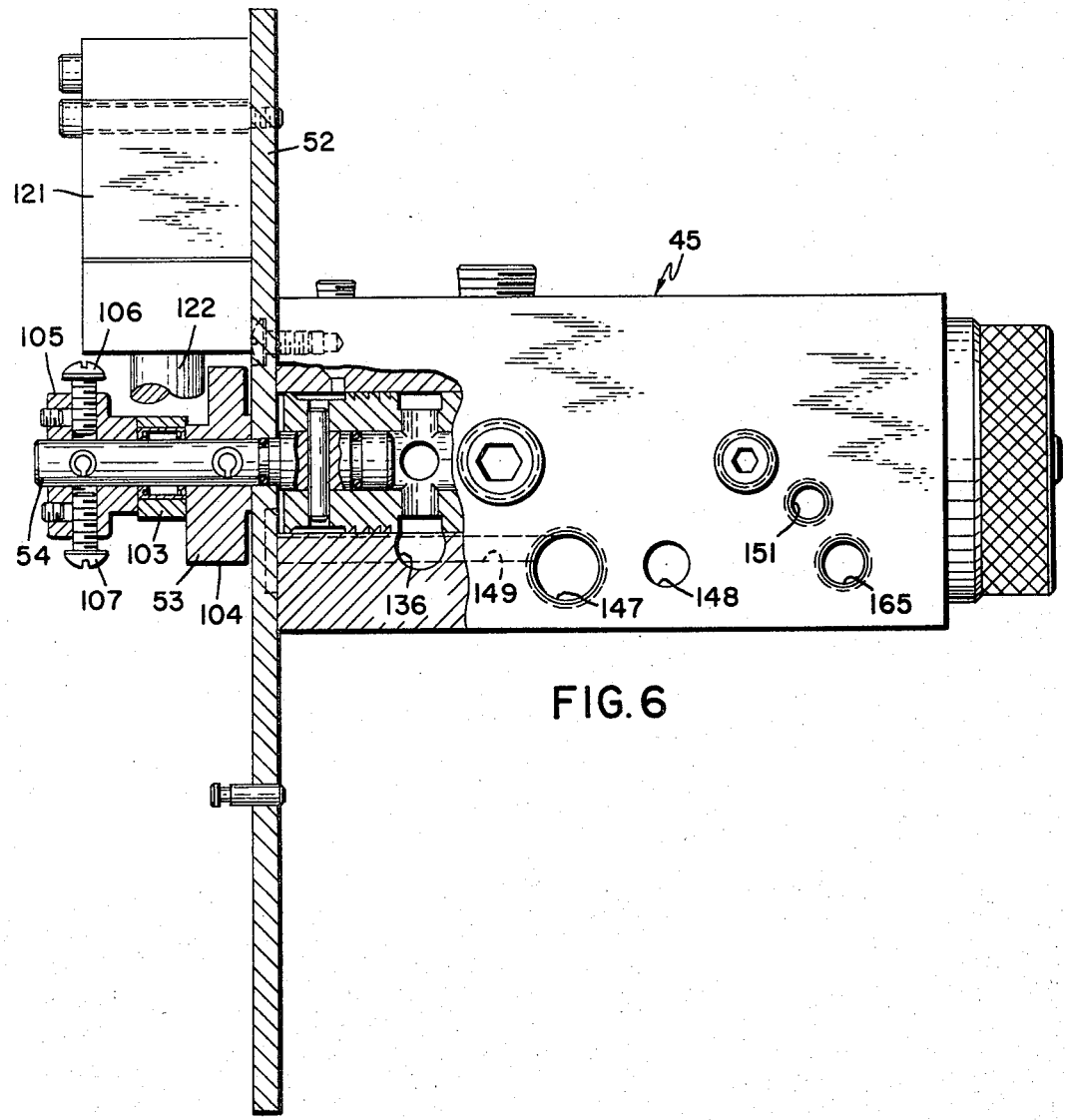
Figure 7:
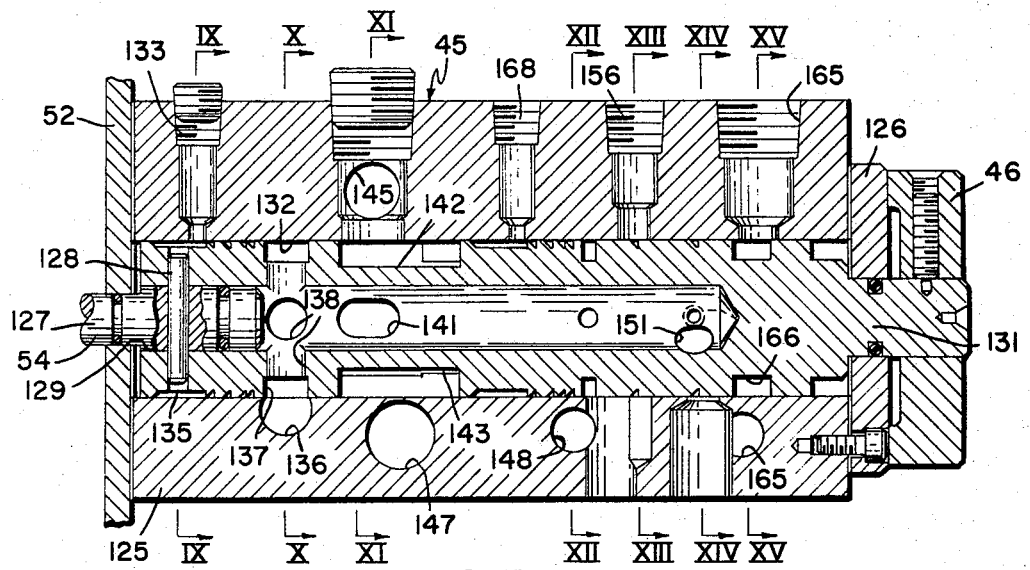
Figure 8:
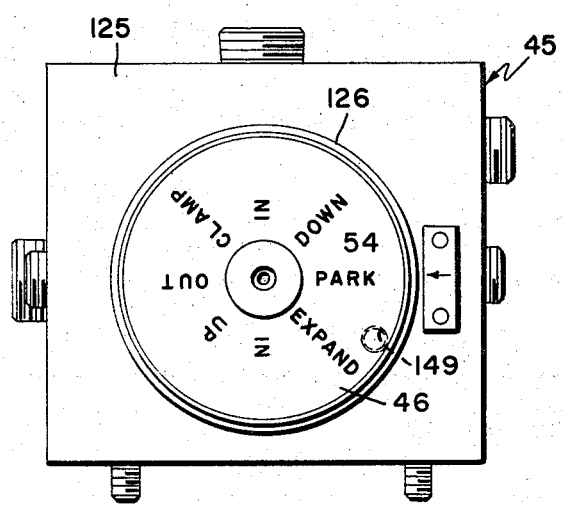
Figure 9:
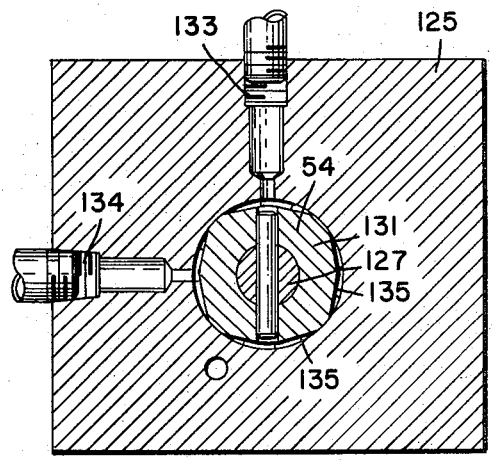
Figure 10:
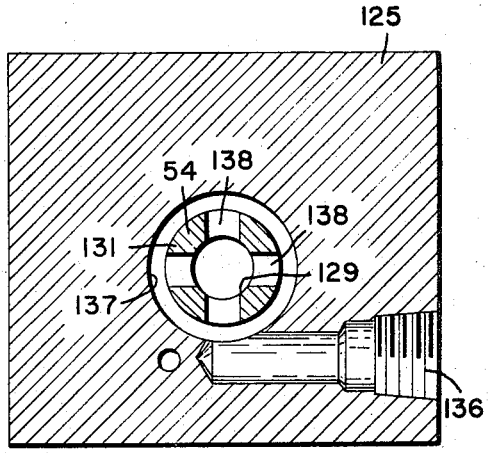
Figure 11:
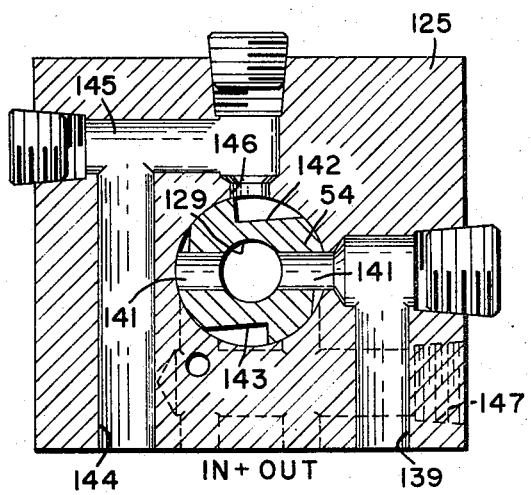
Figure 12:
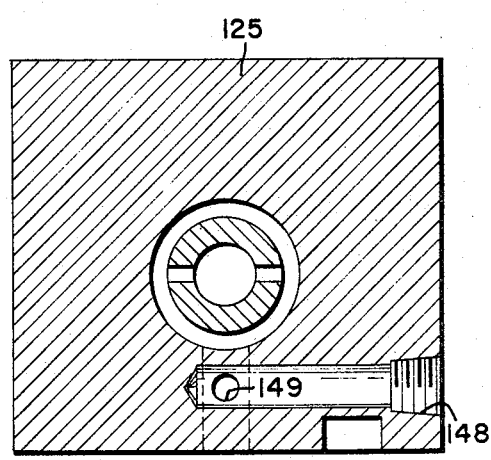
Figure 14:
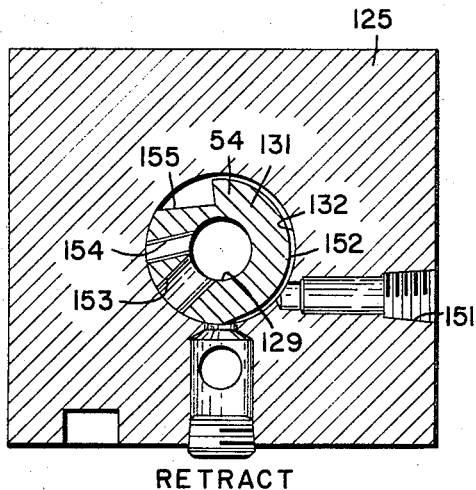
Figure 13:
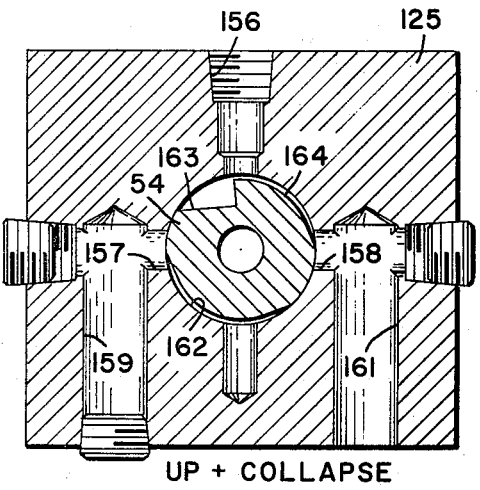
Figure 15:
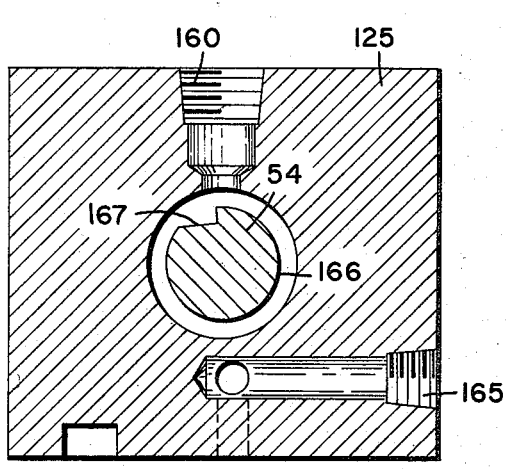

The character of the invention, however, may be best understood by reference to one of its structural forms, as illustrated by the accompanying drawings in which:

FIG. 1 is a pespective view of a loading mechanism embodying the principles of the present invention so viewed from the front, or operator's side, FIG. 2 is a rear elevational view of the mechanism, FIG. 3 is a hydraulic schematic showing a portion of the controls for the machine, FIG. 4 is a hydraulic schematic showing the remainder of the hydraulic controls in the mechanism, FIG. 5 is an enlarged view of an indexing mechanism associated with the invention, FIG. 6 is a sectional view of the mechanism shown in FIG. 5, taken along the line VI—VI of FIG. 5, FIG. 7 is a vertical sectional view of a valve used in the mechanism, FIG. 8 is an end view of the valve, FIG. 9 is a sectional view of the valve taken on the line IX—IX of FIG. 7, FIG. 10 is a sectional view of the valve taken on the line X—X of FIG. 7, FIG. 11 is a sectional view of the valve taken on the line XI—XI of FIG. 7, FIG. 12 is a sectional view of the valve taken on the line XII—XII of FIG. 7, FIG. 13 is a vertical sectional view of the invention taken on the line XIII—XIII of FIG. 7, FIG. 14 is a sectional view of the valve taken on the line XIV—XIV of FIG. 7, and FIG. 15 is a vertical sectional view of the invention taken on the line XV—XV of FIG. 7.

Referring first to FIGS. 1 and 2, wherein are best shown the general features of the invention, the loading mechanism, indicated generally by the reference numeral 20 is shown in use with a grinding machine 21 having a workhead 22 and a wheelhead 23. The wheelhead is provided with a spindle 24 on the other end of which is mounted an abrasive grinding wheel 30. The workhead includes a hollow spindle 25 on the end of which is mounted a jaw-type chuck 26 within which lies an ejection plate 27. The spindle, chuck, and ejection plate are rotated by a motor (not shown). The grinding machine is provided in the usual way with guide ways and hydraulic cylinders to provide longitudinal and transverse relative motion between the workhead 22 and the wheelhead 23 to bring about a grinding operation.

As has been stated, the spindle 25 is hollow and it emerges from the side of the workhead 22 opposite the chuck 26 and is provided with a pulley 28 by which means it is rotated. Emerging from the hollow spindle is a rod 29 (see FIG. 2) which is the actuating rod associated with the ejector plate 27 and this is connected to a piston of a linear actuator, such as a hydraulic cylinder 31. The piston is provided at the other end of the cylinder with a rod 32, which is hollow, and which receives an actuating rod for the chuck. This rod is operated by a linear actuator, such as a hydraulic cylinder 33 mounted on the outboard end of the rod 32 and movable therewith.

Mounted on top of the workhead 22 is a housing 34 containing a horizontal bore and a piston making up a hydraulic cylinder. To the piston is connected a rod 35 which emerges from the housing 34 overlying the chuck 26 and to this is mounted a large cylindrical body 36 carrying at its outer end at a right angle thereto a crank arm 37 having at its outer end a workpiece grasping mechanism 38.

Mounted on the side of the housing 34 is a workpiece chute 39 having an opening 41 from which workpieces may be removed one by one. Mounted at the top of the housing 34 and overlying the cylindrical body 36 is a switch box 42 carrying on its underside a downswitch 43 and an up switch 44. Mounted on top of the housing 34 is a valve 45 having a manual control knob 46.

Referring to FIG. 2, it can be seen that the workpieces 47 are, in the preferred embodiment, tubular members in which the internal bore is to be ground, so that the grinding machine 21 is of the internal grinding variety.

Attached to the piston and emerging from the rear side of the housing 34 (see FIG. 2) is a piston rod 48 which lies within a framework 49 which, in turn, is mounted on the housing 34. Fastened to the outer surface of the framework 49 is an IN-OUT switch 51. Bolted to the side of the housing 34, which is normally away from the machine operator, is a plate 52 on which is mounted an index mechanism 53 associated with a control shaft 54 of the valve 45. Mounted on the plate 52 is a solenoid valve 55 serving to provide pressure air, on occasion, to the indexing mechanism 53.

FIGS. 3 and 4 show schematically the major hydraulic elements in the mechanism and the grinding machine. Generally speaking, most of the hydraulic elements of the loading mechanism 20 are shown in FIG. 3, whereas most of the circuitry shown in FIG. 4 has to do with the circuitry of the grinding machine 21. All of the circuits are provided with pressure oil by a pump 56. This pump is a variable displacement pump giving a flow of 10 gallons per minute at a pressure from 200 to 500 p.s.i. but, in the preferred embodiment, it is arranged to provide 350 p.s.i. in a high pressure line 57 and, after passing through a pressure regulating valve 58, gives 150 p.s.i. in a line 59. The relative motion between the wheelhead 23 and the workhead 22 is brought about by a table cylinder 61, while the cross-feed is brought about by a cross-slide cylinder 62, the feeding taking place by the so-called "controlled force" system. The flow of oil to these two cylinders is controlled in the conventional manner, i.e., by a feed box 63, a table speed valve 64, a throttle valve 65, a transfer valve 66, a runout solenoid valve 67, a workhead control plunger 68, a dresser solenoid valve 69, a backoff solenoid valve 71, a pilot valve 72, a reverse valve 73, a feed-pressure regulating valve 74, a spark-out solenoid valve 75, a table-in solenoid valve 76, a control valve 77, and a shuttle valve 78, all interconnected in the usual way to provide the various movements of the grinding cycle. In addition, in the preferred embodiment the hydraulic circuit is provided with a facing-feed control valve 79 associated with a facing attachment cylinder 81.

Referring to FIG. 3, the circuitry also includes a facedress compensating mechanism 82 and a face-dress cylinder 83, whose operation is controlled by a face-dress operating valve 84. The IN-OUT cylinder 85 (mounted in the housing 34) has a piston 86 which operates the cylindrical body 36 in the axial direction. The body 36 is also provided with a rotary actuator such as a vane-type motor 87 which produces rotation, thus operating the crank arm 37 and the workpiece-grasping mechanism 38. This last-named mechanism is shown as having an actuating cylinder 88 which serves to operate an expanding and contracting mandrel which operates in the bore of the workpiece 47 to grasp and ungrasp the workpiece. Incidentally, it should be noted the presence of the IN-OUT switch 51, the DOWN switch 43, and the UP switch 44 associated with the cylindrical body 36. An important element of the hydraulic circuitry is the valve 45 which, for the purposes of understanding, is divided into its sections to show the way in which the various hydraulic connections are made. The ejector cylinder 33 is shown in relation to the other hydraulic circuitry. The high pressure line 57 is provided with a check valve 89 and an accumulator 91. Finally, a safety interlock cylinder 92 is provided, as well as a chuck pressure regulating valve 93 associated with the chuck cylinder 31.

FIGS. 5 and 6 show the details of the index mechanism 53 mounted on the panel 52. The solenoid valve 55 receives pressure air from a conduit 95 and is connected to the bottom of a pneumatic cylinder 96 by a conduit 97. The conduit 95 is also connected directly to the top of the cylinder 96 by a conduit 98. The lower end of the cylinder 96 is pivotally connected by a pivot pin 99 to the plate 52, while from the upper end protrudes a piston rod 101 which is connected by a pivot pin 102 to a crank arm 103 which, in turn, is mounted on the shaft 54 of the valve 45. Keyed to the shaft 54 between the arm 103 and the plate 52 is a multi-faceted element such as star member 104 while, on the shaft 54 outboard of the arm 103 is mounted a hub 105 which is keyed to the shaft 54 and which carries two contact screws 106 and 107 spaced 180° apart. The crankarm 103 is freely pivoted on the shaft, while the star member 104 and the hub 105 are locked to the shaft. The arm 103 carries a pawl 108 which is hingedly connected to the arm by a pivot pin 109 and locked thereto. The pivot pin, in turn, is provided with a radial finger 111. Connected to an intermediate point of the pawl 108 is one end of a coil spring 112, the other end of which is fastened by a pin 113 to the plate 52.

A lever 114 is swingably connected at an intermediate point to the plate 52 by a pivot pin 115. It has mounted at one end a cam roller 116 which is held in pressing contact with the star member 104 by the presence of a coil spring 117, one end of which is connected to the other end of the lever 114 and the other end of which is connected to an adjusting plate 118 mounted at the upper edge of the plate 52. Mounted on the plate 52 adjacent the hub 105 and in the path of the actuating contact screws 106 and 107 is a switch 119. Furthermore, mounted on the plate 52 is a safety interlock mechanism 121 containing the interlock cylinder 72. This cylinder has a piston rod 122 having a pointed end that fits precisely in the valley between the points of the star member 104 and is held in that position by a coil spring 123. The housing of the cylinder has an inlet port 124 to admit pressure oil to the underside of the piston to operate it against the spring 123 and withdraw the piston rod 122 from the star member 104, on occasion.

FIGS. 7 through 15 show the details of the valve 45. It consists, basically, of the shaft 54 mounted in a solid metal body 125. The plate 52 acts to close off one end of the valve while, at the other end, mounted on the shaft is a disc 126 over which is mounted the knob 46. The shaft 54 is composed of a thin spindle 127 which is fastened by a pin 128 in a bore 129 formed in a spool 131. The spool, in turn, is of generally cylindrical form and is rotatable in a bore 132 extending longitudinally of the body 125. All of the sectional views of the valve are taken with the dial set for "Park," which is the condition which exists when the workpiece grasping mechanism 38 is in an upper outer position while grinding is taking place. As is shown in FIG. 9, the body 125 is provided with two gage ports 133 and 134 leading to a portion of the spool 131 which is formed with relatively flat cutout portions or lands 135. These lands form hydrostatic bearings for supporting the spool with a minimum of friction and without undesirable unbalanced thrust.

Referring to FIG. 10, a port 136 leads to an annular groove 137 which extends entirely around the spool 131 and from this groove extend radial passages 138 which terminate in the bore 129.

FIG. 11 shows a port 139 entering the bottom surface of the body 125. The spool is provided with radial passages 141 which terminate in the bore 129. At positions spaced 90° away from these passages the spool is provided with notches 142 and 143. From the bottom surface of the body extends a port 144 extending vertically and joined to a passage 145 and a vertical passage 146 that terminates at the top of the spool. The passages 139 and 144 are connected directly into the housing 134 to operate the cylinder 85. In FIG. 11 can also be seen the exhaust port 147 connected by passages to the same cylinder.

In FIG. 12 a port 148 leads across the body 125 and is connected to a longitudinal passage 149 which extends longitudinally through the body.

FIG. 14 shows a port 151 which extends horizontally to the bore 132 in the body 125. At that point, the spool is provided for at least 180° of its circumference with a shallow groove 152. A passage 153 extends radially from the bore 129 in the spool 131 and a similar passage 154 also extends outwardly from the bore 129. Furthermore, at the extreme end of the groove 152 the spool is provided with a notch 155.

In FIG. 13 a port 156 enters the top of the body while passages 157 and 158 extend horizontally from the surface of the bore 132 and join, respectively, vertical passages 159 and 161 which extend downwardly to the bottom of the body. The spool at this portion is provided with a groove 162 extending for about 120° of its circumference. Diametrically opposite this it is provided with a notch 163 from one side of which extends a groove 164 for approximately 90° of the circumference.

Finally, in FIG. 15 we see a port 165 entering the side of the body. At that point the spool is provided with a groove 166 extending entirely around it, but there is a notch 167 at that point on exhaust passage 160 extending vertically from the top of the spool.

The high pressure line 57 is connected to the pressure port 136 so that the bore 129 in the center of the spool carries high pressure oil at all times. This oil is distributed to the various elements of the hydraulic system during the rotation of the spool. The manner in which this is accomplished is shown in FIG. 10; this figure shows the pressure oil coming into the port 136, passing around the end of the groove 137, and passing through the radial passages 138 to the central bore 129. The pressure for the hydrostatic bearings represented by the lands 135 in FIG. 9 comes into the spool in this way and makes its way to the lands along the outer surface of the spool, there being sufficient space between the surface of the spool and the bore 137 to permit this.

The ejector section is shown in FIGS. 14 and 15, the ports 151 and 165 are connected to opposite sides of the ejector cylinder 33. As shown in FIG. 11, the passages 139 and 144 are connected to opposite ends of the cylinder 85 to provide in and out motion of the loading apparatus. The arrangement shown in FIGS. 12 and 13 shows the connections of the passages 148 and 156 to the opposite ends of the loading plug cylinder 88. FIG. 13 shows the portion of the valve which serves the vane-type motor 87 which serves to raise and lower the loading arm 37. This is accomplished through an exhaust port and a bottom port 161. Finally, FIG. 15 shows the section of the valve which handles the operation of the cylinder 31 which clamps and unclamps the chuck 26. The port 165 leads to the cylinder and provision for exhaust is made in the cylinder itself.

Since there are eight positions of the knob 46 and, therefore, eight functions of the valve, each time the knob is turned 45° to bring another functional marking in line with the arrow at the right-hand side, a different set of circumstances controls the passages and ports in the valve. The valve shaft 54 is, of course, rotated through these increments of 45° by the index mechanism 53.

The operation of the apparatus will now be readily understood, in view of the above description. The grinding machine 21 is operated in the usual way with the table cylinder 61 bringing about relative longitudinal motion between the wheelhead 23 and the workhead 22, while the cross-slide cylinder 62 operates to bring about transverse relative movement between the two members. These two motions produce the grinding operations by bringing about controlled contact between the revolving abrasive wheel 30 and the workpiece 47 held in the chuck 26. The loading mechanism is in the condition shown in FIGS. 1 and 2 with the crank arm 37 in a horizontal (UP) condition and the workpiece grasping mechanism 38 away (OUT) from the chute 41. When the grinding operation is indicated by the closing of a switch which, in turn, starts the loading cycle. Now, when the loading arm 37 and the workpiece grasping mechanism 38 are in the "PARK" position with a workpiece 47 on the mechanism 38, the UP switch 43 and the DOWN switch 44 are contacted by a cam on the surface of the cylindrical body 36. The index solenoid valve 55 is energized, thus presenting air to the bottom of the cylinder 96. This, among other things, serves to unclamp the chuck 26 and eject the workpiece. The operation of the cylinder 96 causes the star member 104 to be indexed 45° and the spool of the valve 45 with it. This motion from "PARK" to "DOWN" is indicated, of course, on the knob 46. The valve in the "DOWN" position releases the "UP" switch 43 as the vane motor 87 operates and swing the arm 37 downwardly. When the "UP" switch has been released by the cam moving away from it, this de-energizes the index solenoid valve 55 and allows the cylinder 96 to retract. Eventually, the "DOWN" switch 44 is contacted indicating that the arm has swung through a desirable angle so that the workpiece-grasping mechanism 38 is in alignment with the chuck 26. When the "DOWN" switch 44 has been contacted, this energizes the index solenoid valve 55 again and operates the cylinder 96 to rotate the star member 104 another 45° carrying the spool of the valve 46 with it to the "IN" position.

As the valve moves into the "IN" position, this releases the "DOWN" switch, since it moves off the cam on the body 36 and the index solenoid valve is de-activated and causes the cylinder 96 to retract. The cylinder 85 causes the arm 37 with the workpiece-grasping mechanism 38 to move inwardly toward, and enter, the chuck. When it reaches that position, the "IN" switch 51 (see FIG. 2) is closed which energizes the index solenoid valve 55 and operates the cylinder 96. At the same time, the clamping cylinder 31 is energized so that the chuck grasps the new workpiece. The workpiece 47 is rotatable on the mechanism 38, so that as it moves into the chuck, the workpiece contacts the revolving ejector plate 27 and is brought up to chuck speed before clamping takes placed. This reduces scuffing of the workpiece by the chuck jaws.

The knob 46 now moves into CLAMP position, at which time the screw 106 on the hub 105 contacts the switch 119 and starts a clamp timer. At the same time, the valve 45 collapses the expandable sleeve or mandrel on the workpiece-grasping mechanism 38. This leaves the workpiece in the chuck 26, de-energizes the index solenoid valve 55, and retracts the cylinder 96.

As soon as the clamp timer times out, this automatically energizes the index solenoid valve 55 and causes it to energize the cylinder 96 which revolves the spool around to the "OUT" position, so that the valve 45 causes the workpiece-loading mechanism to move longitudinally out of the area of the chuck; eventually, the "IN" switch 51 is released which de-energizes the index solenoid valve 55. The cam on the cylindrical body 36 eventually hits the "DOWN" switch 43 again, which energizes the index solenoid valve 55 and operates the cylinder 96, causing the valve to move around to the next position which is the "UP" position.

The knob is now in the "UP" position and the body 36 is revolved by the vane motor 87 until eventually the "DOWN" switch 43 is released which de-energizes the solenoid valve 55 and causes the cylinder 96 to retract once more. The "UP" switch 44 is contacted and starts the wheelhead table in for a grinding cycle. It energizes the index solenoid valve 55 which, in turn, operates the cylinder 96 for another index of the star member 104. The valve now moves around to the IN position; this causes oil to be presented to the cylinder 85 to move the arm 37 and the workpiece-grasping mechanism 38 inwardly into alignment with the opening 41 in the chute 39. With the valve still in the IN position, the UP switch 44 is released by the cam on the cylinder 36 moving away from it. This causes the solenoid valve 55 to be released and allows the cylinder 96 to retract. Eventually, the IN switch 51 is contacted. This is when the mechanism 38 lies within the bore of a workpiece 47 in the chute 39. The oil is then presented to the cylinder 88 to expand the mandrel and grasp the workpiece. At that time, the screw 107 in the index mechanism 53 strikes the valve 119 and starts a timer. This provides the sleeve with sufficient time to expand and grasp the workpiece tightly before the next part of the cycle begins. When the timer starts, the index solenoid valve 55 is de-energized, thus allowing the cylinder 96 to retract. The valve is in the EXPAND position at that point and the "timing out" of the timer energizes the index solenoid valve 55 and causes the cylinder 96 to move to rotate the valve around to PARK position again. When reaching PARK position, the IN switch 51 is released. The arm 37 has been moved out by energization of the cylinder 85, so that the workpiece-grasping mechanism 38 resides in PARK position; that is to say, it is axially aligned with the opening 41 in the chute 39; it is in the UP position and it is in the OUT position. At that point, the index solenoid valve 55 is not energized because this has been prohibited by the electrical apparatus of the machine tool during the grinding operation. It will only be energized again when it is told to do so by the switch indicating the termination of the grinding operation.

It can be seen that the present apparatus provides a loading mechanism for machine tools which performs a plurality of functions with one valve, yet which is simple in construction and is not unduly complicated. It is inexpensive to manufacture and need not be subject to extensive maintenance. As a matter of fact, it is almost entirely hydraulically operated, thus resulting in simple operation. The sequential valve permits automatic operation through the loading cycle; at times, by release of the interlock cylinder 92, it is possible to grasp the knob 46 and to index the loading by hand or in a semi-automatic manner. The duration of a particular portion of the cycle and its place in the cycle is determined by the construction of the spool and valve elements and these factors can be adjusted and changed to suit a particular cycle of operation. More specifically, this is accomplished by removing the valve and replacing it with another valve having suitable passages to make the change desired. It can be seen that the workpiece is brought up to speed by its initial contact with the ejector plate 27, so that, when the clamping mechanism of the chuck 26 is brought to bear on the workpiece, no scratching of the workpiece takes place, since the chuck and the workpiece are rotating at the same speed. The valving is set up so that the ejector plate 27 is in ejector position as the workpiece approaches the chuck and is retracted at the same speed and at the same time that the workpiece is entering the chuck, so that the two are in contact and the workpiece is readily brought up to speed. The provision of a timing mechanism to assure the clamping of the workpiece by the chuck before it is released from the workpiece-grasping mechanism 38 and to regulate the timing which takes place when the workpiece mechanism 38 is grasping the workpiece in the chute 39 guarantees that the workpiece is tightly grasped in either position before further movement takes place.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A loading mechanism for a machine tool, including a workpiece loading station and a workpiece work station, comprising
    (a) a grasping mechanism,
    (b) an arm pivotally mounted for swinging motion about an axis through one end, the grasping mechanism being mounted on the other end of the arm,
    (c) an actuator for bringing about the said swinging motion of the arm to align the grasping mechanism with the loading station at one end of the swinging motion and with the work station at the other end of the motion,
    (d) an actuator for moving the arm in the direction of the said axis to move the grasping mechanism in and out of the loading station or the work station,
    (e) A multi-position valve provided to introduce pressure fluid to the elements to produce a cycle of loading movements,
    (f) an indexing mechanism provided to produce incremental movement of the valve from one position to another, the indexing mechanism including a star member mounted on the valve, an actuator and pawl for rotating the star member, and an interlock for preventing rotation of the star member during a machine tool work cycle.

2. A loading mechanism as recited in claim 1, wherein an ejector is provided in association with the work position, the ejector rotating continuously and being controlled by the workpiece as it approaches the work position, and wherein an actuator is provided to move the ejector longitudinally in a path parallel to the said axis.

3. A loading mechanism as recited in claim 1, wherein a chuck is provided in association with the work position, the chuck being rotatable and having a workpiece clamping means, and wherein an actuator is provided to operate the said clamping means.

4. A loading mechanism as recited in claim 1, wherein the grasping mechanism includes an expandable mandrel operated by an actuator and wherein a timer is provided to prevent movement of the arm until the mandrel has completely grasped the workpiece.

5. A loading mechanism as recited in claim 3, wherein a timer is operative during the operation of the actuator to operate the clamping means of the chuck to prevent movement of the arm until clamping has been completed.

6. A loading mechanism for a machine tool, including a workpiece loading station and a workpiece work station, comprising
    (a) a workpiece grasping mechanism,
    (b) a chuck mounted in association with the work position, the chuck being rotatable and having a workpiece clamping means and an actuator provided to operate the said clamping means,
    (c) an arm pivotally mounted for swinging motion about an axis through one end, the workpiece grasping mechanism being mounted on the other end of the arm,
    (d) an actuator for bringing about the said swinging movement of the arm to align the grasping mechanism with the loading station at one end of the swinging motion and with the work station at the other end of the motion,
    (e) an actuator for moving the arm in the direction of the said axis to move the grasping mechanism in and out of the loading station or the work station,
    (f) an ejector provided in association with the chuck, the ejector being rotatable and being contacted by the workpiece as it approaches the work position, an actuator being provided to move the ejector longitudinally in a path parallel to the said axis,
    (g) a multi-position valve provided to introduce pressure fluid to the elements to produce a cycle of loading movements, and
    (h) an indexing mechanism to produce incremental movement of the valve from one position to another, the indexing mechanism including a multi-faceted element mounted on the valve, an actuator and pawl for rotating the element, and an interlock for preventing rotation of the element during a machine tool work cycle.

References Cited

UNITED STATES PATENTS

| | | | |
|---|---|---|---|
| 2,382,311 | 8/1945 | Heald | 51—48 |
| 2,671,293 | 3/1954 | Grobey | 51—215 X |
| 2,979,870 | 4/1961 | Pollard | 51—215 |
| 3,089,289 | 5/1963 | Serafin | 51—215 X |
| 3,269,064 | 8/1966 | Lockwood | 51—215 X |

FOREIGN PATENTS 679,456   2/1964   Canada.

ROBERT C. RIORDON, *Primary Examiner.*
D. G. KELLY, *Assistant Examiner.*

U.S. Cl. X.R.

214—1